US009966821B2

(12) United States Patent
Aso et al.

(10) Patent No.: US 9,966,821 B2
(45) Date of Patent: May 8, 2018

(54) ELECTRIC-MOTOR ROTOR, ELECTRIC MOTOR, AND AIR CONDITIONER

(71) Applicant: Mitsubishi Electric Corporation, Tokyo (JP)

(72) Inventors: Hiroki Aso, Tokyo (JP); Yuto Urabe, Tokyo (JP); Kazunori Sakanobe, Tokyo (JP); Mineo Yamamoto, Tokyo (JP); Hiroyuki Ishii, Tokyo (JP); Junichiro Oya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 233 days.

(21) Appl. No.: 15/025,639

(22) PCT Filed: Oct. 18, 2013

(86) PCT No.: PCT/JP2013/078330
§ 371 (c)(1),
(2) Date: Mar. 29, 2016

(87) PCT Pub. No.: WO2015/056344
PCT Pub. Date: Apr. 23, 2015

(65) Prior Publication Data
US 2016/0233747 A1    Aug. 11, 2016

(51) Int. Cl.
*H02K 11/00*    (2016.01)
*H02K 1/04*    (2006.01)
(Continued)

(52) U.S. Cl.
CPC ........... *H02K 15/02* (2013.01); *F04D 13/064* (2013.01); *H02K 1/02* (2013.01); *H02K 1/278* (2013.01);
(Continued)

(58) Field of Classification Search
CPC .................................. H02K 1/02; H02K 11/00
(Continued)

(56) References Cited

FOREIGN PATENT DOCUMENTS

JP          08-051746 A      2/1996
JP          10257723 A   *  9/1998
(Continued)

OTHER PUBLICATIONS

International Search Report of the International Searching Authority dated Jan. 21, 2014 for the corresponding International application No. PCT/JP2013/078330 (and English translation).

*Primary Examiner* — Jose Gonzalez Quinones
(74) *Attorney, Agent, or Firm* — Posz Law Group, PLC

(57) ABSTRACT

To provide an electric-motor rotor including a cylindrical yoke, a resin magnet portion that is formed from resin magnet integrally with the outer periphery of the yoke, a position-detecting magnet that is located on one axial-end side of the resin magnet portion, a plurality of seats that are formed on the axial end surface of the yoke on the side of the position-detecting magnet, each of which includes a pair of protruding portions, and an opening formed between the protruding portions, and a seat connecting portion that is formed with the seats on its top surface, wherein a ribbed runner that supplies the resin magnet to the resin magnet portion through the opening is provided at the opening to form, along with the seat, a seat portion that places thereon the position-detecting magnet.

5 Claims, 7 Drawing Sheets

(51) Int. Cl.
*H02K 21/12* (2006.01)
*H02K 1/02* (2006.01)
*H02K 1/28* (2006.01)
*H02K 15/02* (2006.01)
*H02K 1/27* (2006.01)
*H02K 11/215* (2016.01)
*F04D 13/06* (2006.01)
*H02K 5/10* (2006.01)
*H02K 15/12* (2006.01)

(52) U.S. Cl.
CPC .............. *H02K 11/215* (2016.01); *H02K 5/10* (2013.01); *H02K 15/12* (2013.01)

(58) Field of Classification Search
USPC ......... 310/43, 68 B, 156.01, 156.06, 156.07, 310/156.21
See application file for complete search history.

(56) References Cited

FOREIGN PATENT DOCUMENTS

| | | | |
|---|---|---|---|
| JP | 2007-221866 A | | 8/2007 |
| JP | 2010063285 A | * | 3/2010 |
| JP | 2011-061936 A | | 3/2011 |
| JP | 2011-061937 A | | 3/2011 |
| JP | 2011-061938 A | | 3/2011 |
| JP | 2011061937 A | * | 3/2011 |
| JP | 2011-120335 A | | 6/2011 |
| JP | 2011120335 A | * | 6/2011 |
| JP | 2012-151979 A | | 8/2012 |
| WO | 2012/098943 A1 | | 7/2012 |

\* cited by examiner (a)

(b)

(c)

(a)

(b)

(c)

ELECTRIC-MOTOR ROTOR, ELECTRIC MOTOR, AND AIR CONDITIONER

CROSS REFERENCE TO RELATED APPLICATION

This application is a U.S. national stage application of International Patent Application No. PCT/JP2013/078330 filed on Oct. 18, 2013, the disclosure of which is incorporated herein by reference.

TECHNICAL FIELD

The present invention relates to an electric-motor rotor, an electric motor, and an air conditioner.

BACKGROUND

Patent Literature 1 discloses an electric-motor rotor including a yoke, a resin magnet portion formed integrally with the outer periphery of the yoke, a position-detecting magnet provided at one axial end of the resin magnet portion, and seats formed at the axial end of the yoke on the position-detecting magnet side, each of which includes a pair of protruding portions, and an opening formed between the pair of protruding portions, wherein the resin magnet portion is molded from resin magnet supplied from a donut-shaped runner that protrudes axially outward from the axial end surface of the yoke on the position-detecting magnet side, and that is positioned on the inner side of the yoke, and from ribbed runners that extend radially outward from the donut-shaped runner, and each of the ribbed runners uses the opening of the seat as a resin-magnet supply path, and is also integrated with the seat to form a seat portion. It is described in Patent Literature 1 that due to the configuration as described above, improvement in the quality of the seat portion on which the position-detecting magnet is set in place, and the quality of a position-detecting-magnet holding protrusion that holds the outer periphery of the position-detecting magnet is achieved.

PATENT LITERATURE

Patent Literature 1: Japanese Patent Application Laid-open No. 2011-61938

However, in the electric-motor rotor described in Patent Literature 1, when the resin magnet portion and the position-detecting magnet are distanced from each other in the axial direction, the seats to be formed on the yoke are elongated. This makes it difficult to mold the seats. Also, because the opening of the seat is larger-sized, the required amount of resin magnet is increased, which is more costly.

SUMMARY

The present invention has been achieved to solve the above problems, and an object of the present invention is to provide an electric-motor rotor, an electric motor, and an air conditioner that make it possible to improve the quality of the rotor by facilitating formation of seats, and that also make a cost reduction possible by reducing a required amount of resin magnet.

According to an aspect of the present invention in order to solve the above-mentioned problems and achieve the object, there is provided an electric-motor rotor including: a cylindrical yoke; a resin magnet portion that is formed from resin magnet integrally with an outer periphery of this yoke; a position-detecting magnet that is located on one axial-end side of this resin magnet portion; a plurality of seats that are formed in a circumferential direction on an axial end surface of the yoke on a side of the position-detecting magnet, each of which includes a pair of protruding portions, and an opening formed between the pair of protruding portions, and places the position-detecting magnet on the pair of protruding portions; and a seat connecting portion that is formed on the axial end surface, that is formed with the seats on a top surface of the seat connecting portion, and that connects the seats, wherein a runner that supplies the resin magnet to the resin magnet portion through the opening is provided at the opening to form, along with the seat, a seat portion that places thereon the position-detecting magnet.

According to the present invention, it is possible to provide an electric-motor rotor, an electric motor, and an air conditioner that make it possible to improve the quality of the rotor by facilitating formation of seats, and that also make a cost reduction possible by reducing a required amount of resin magnet.

BRIEF DESCRIPTION OF DRAWINGS

FIG. 3(a) is a side view as viewed from the opposite side to a position-detecting magnet, FIG. 3(b) is a cross-sectional view taken along a line B-B in FIG. 3(a), and FIG. 3(c) is a side view as viewed from the position-detecting magnet side.

FIG. 4(a) is a side view as viewed from the opposite side to the position-detecting magnet, FIG. 4(b) is a cross-sectional view taken along a line C-C in FIG. 4(a), and FIG. 4(c) is a side view as viewed from the position-detecting magnet side.

FIG. 5(a) is a side view as viewed from the opposite side to the position-detecting magnet, FIG. 5(b) is a cross-sectional view taken along a line D-D in FIG. 5(a), and FIG. 5(c) is a side view as viewed from the position-detecting magnet side.

DETAILED DESCRIPTION

Exemplary embodiments of an electric-motor rotor, an electric motor, and an air conditioner according to the present invention will be explained below in detail with reference to the accompanying drawings. The present invention is not limited to the embodiments.

First Embodiment

Figure 1:
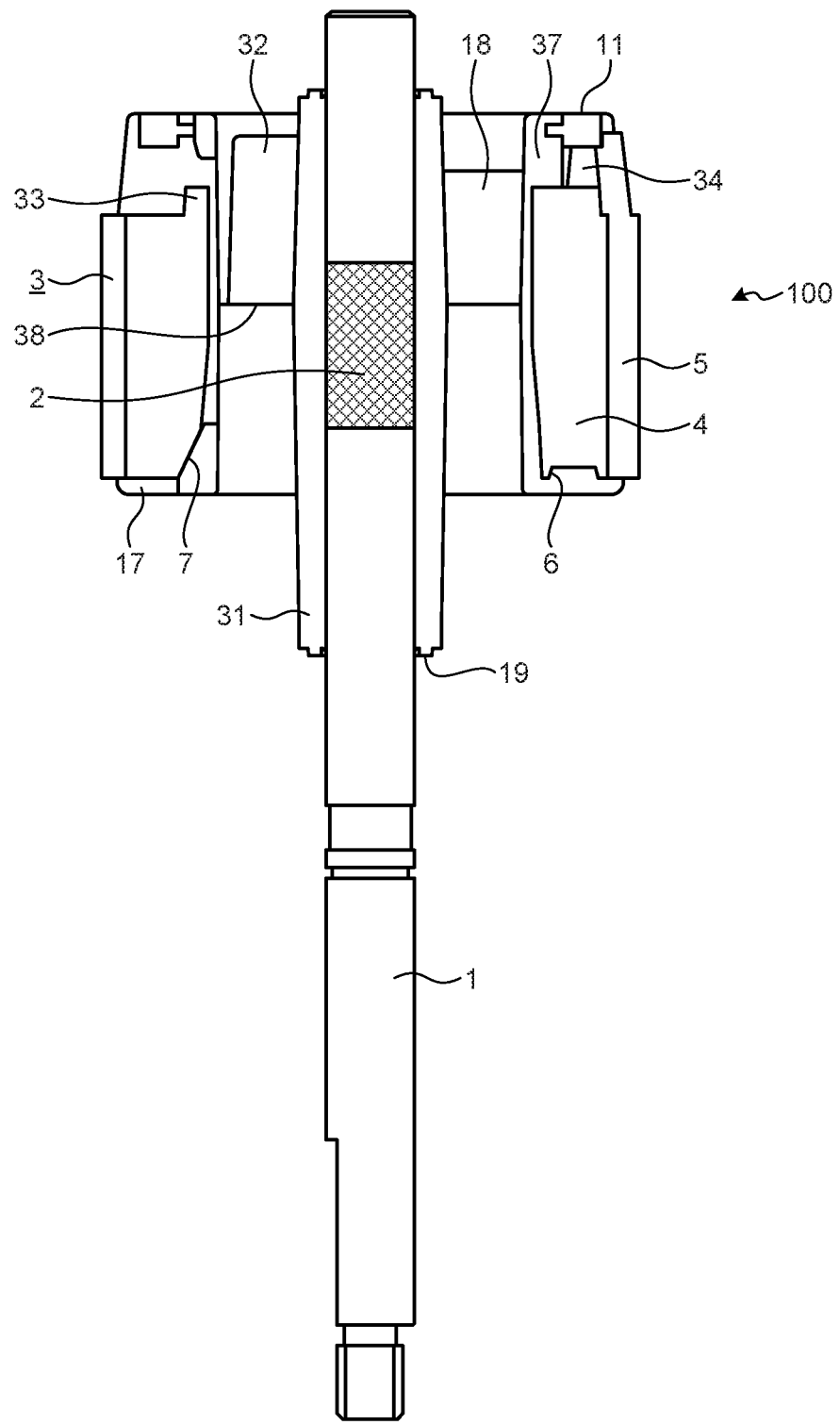
FIG. 1 is a vertical cross-sectional view illustrating a configuration of an electric-motor rotor according to a first embodiment.
Figure 2:
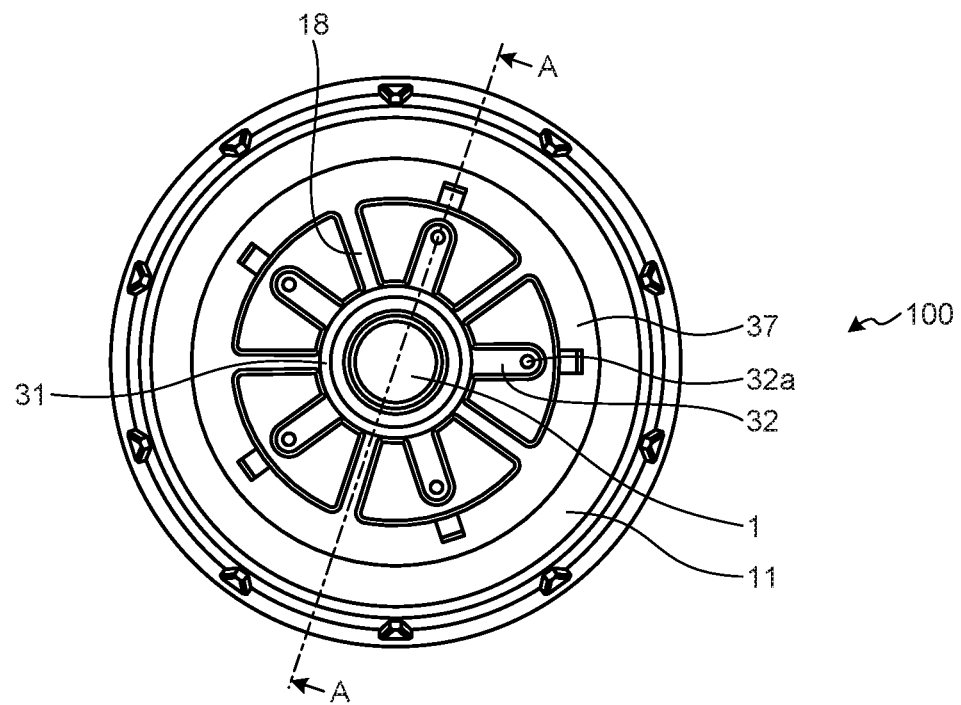
FIG. 2 is a side view illustrating the configuration of the electric-motor rotor according to the first embodiment.

FIG. 1 is a vertical cross-sectional view illustrating a configuration of an electric-motor rotor according to a first embodiment of the present invention. FIG. 2 is a side view illustrating the configuration of the electric-motor rotor according to the present embodiment.

Figure 3:
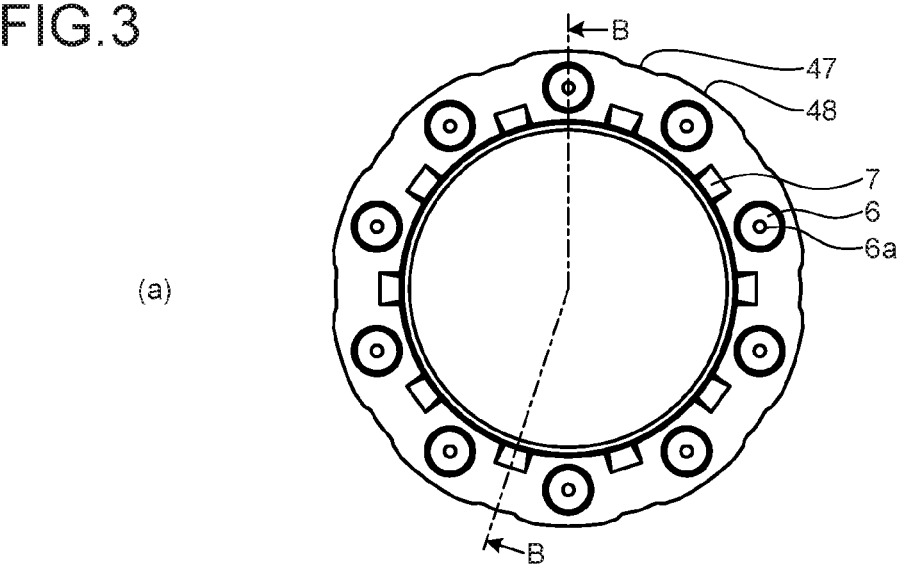
FIG. 3 are diagrams illustrating a configuration of a yoke, where
Figure 3:
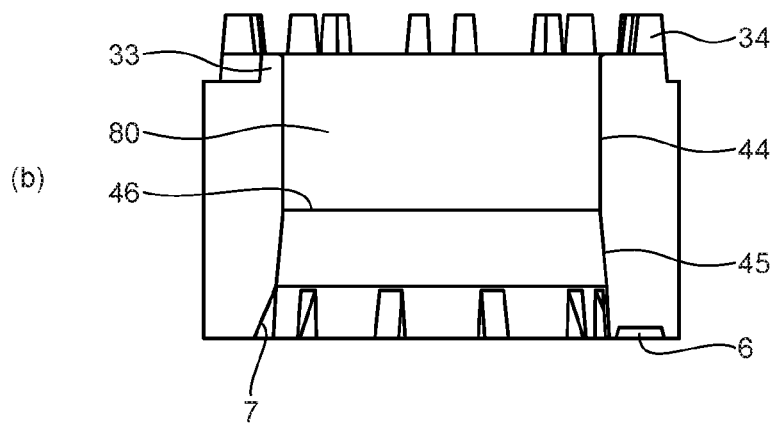
Figure 3:
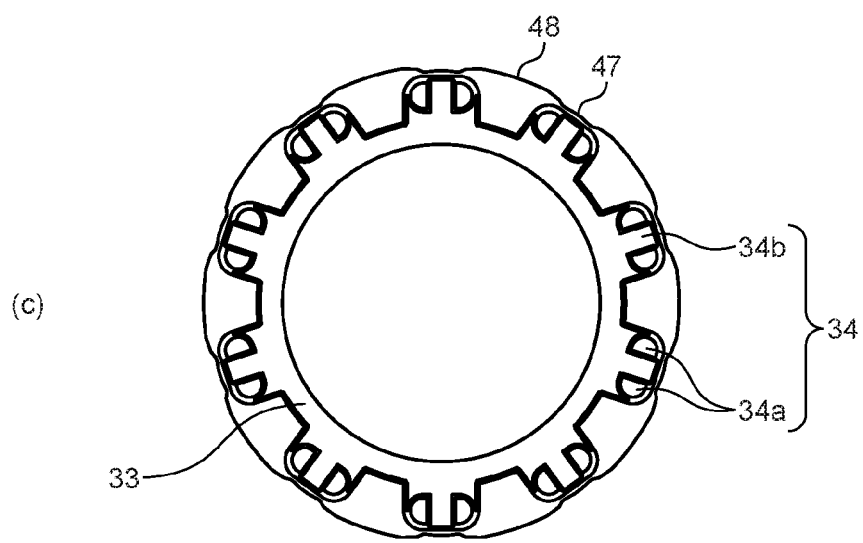
Figure 4:
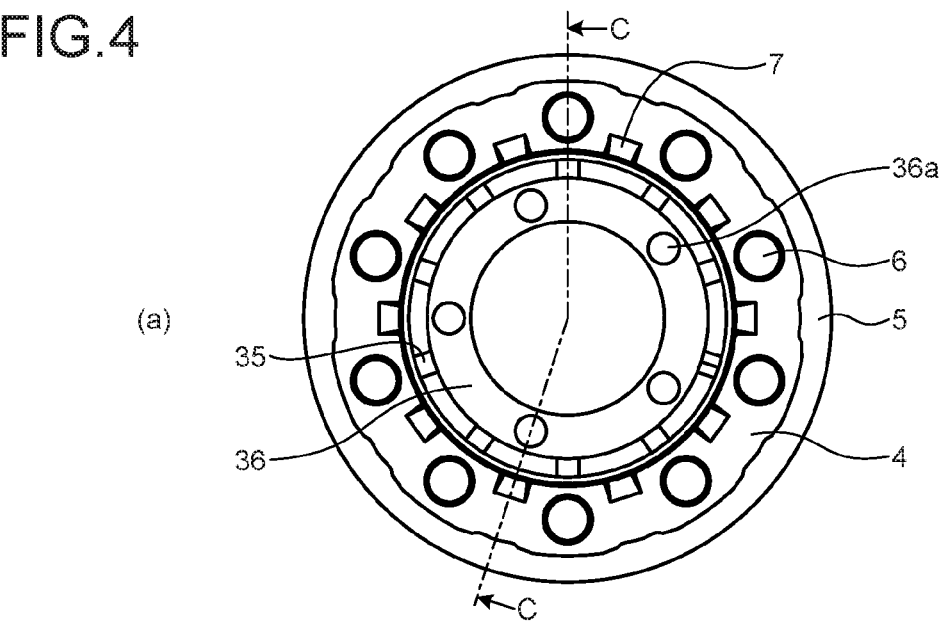
FIG. 4 are diagrams illustrating a configuration of a rotor magnet with a donut-shaped runner, where
Figure 4:
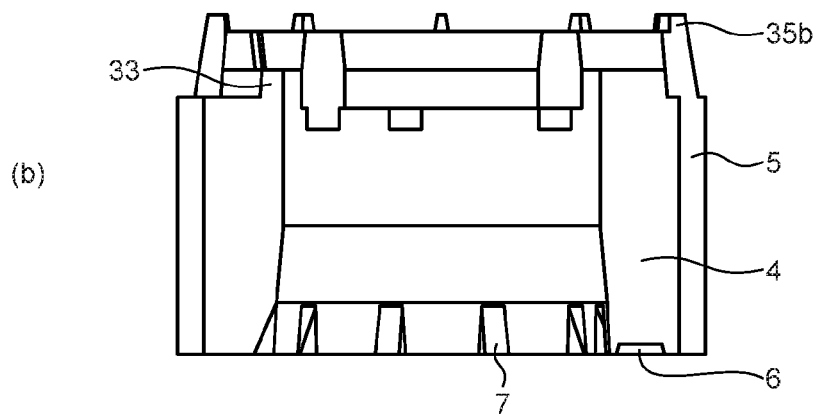
Figure 4:
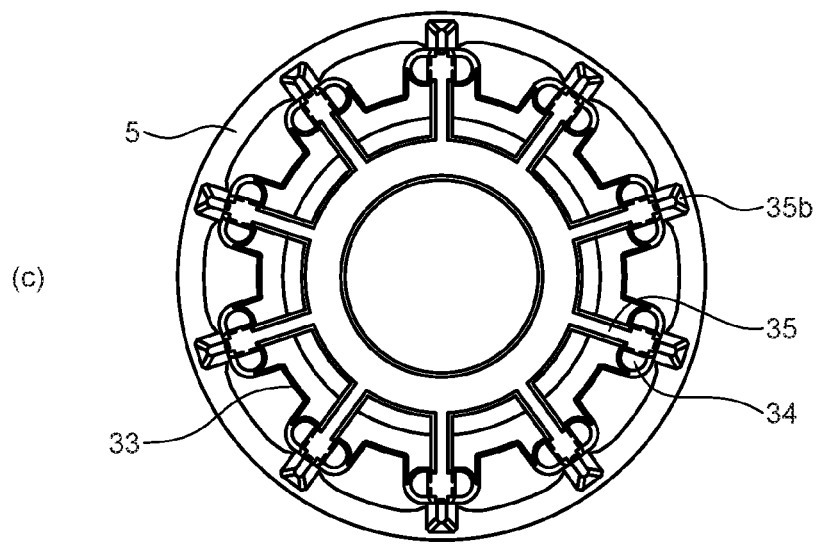
Figure 5:
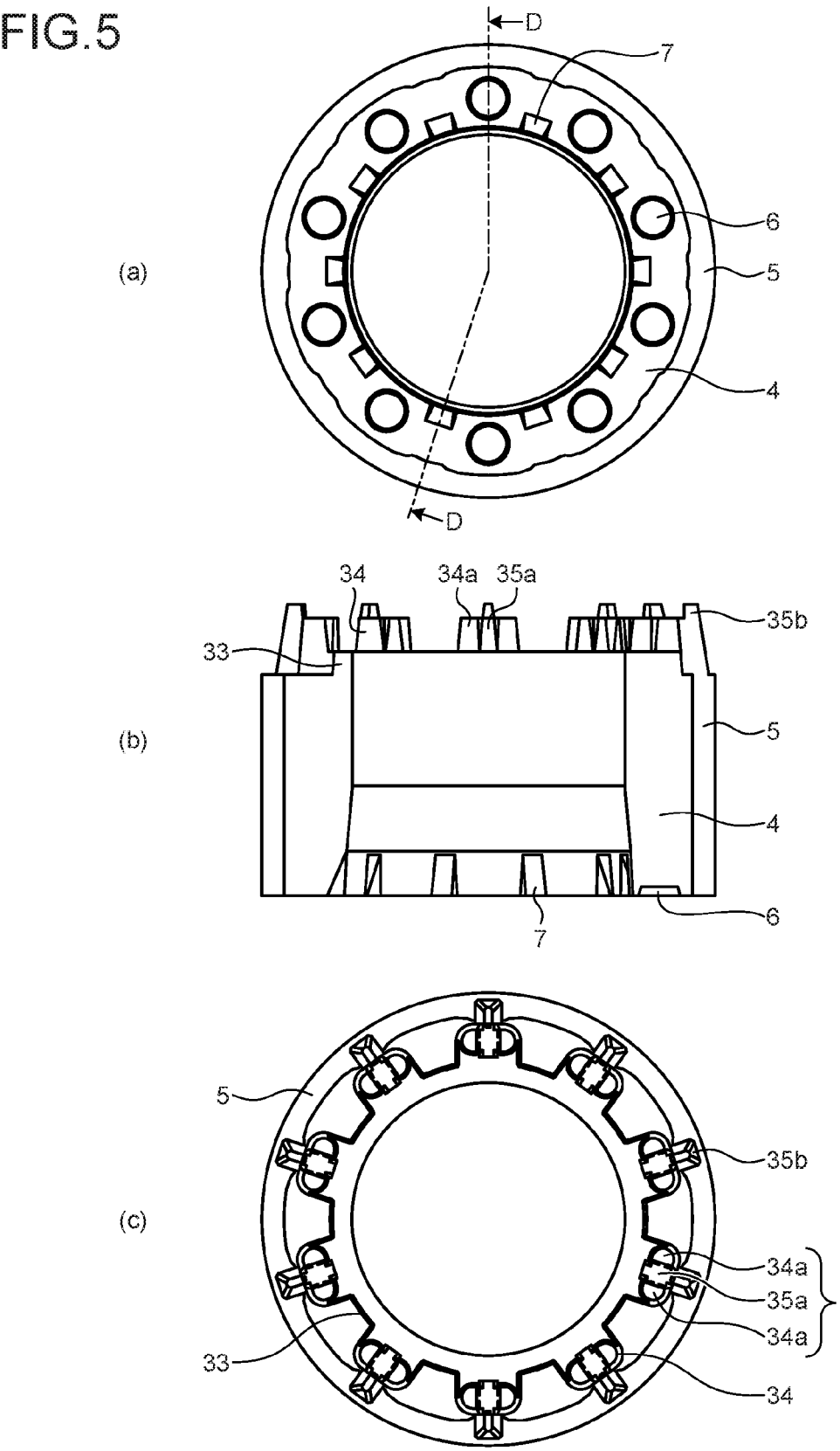
FIG. 5 are diagrams illustrating a configuration of the rotor magnet after the donut-shaped runner is removed, where
Figure 6:
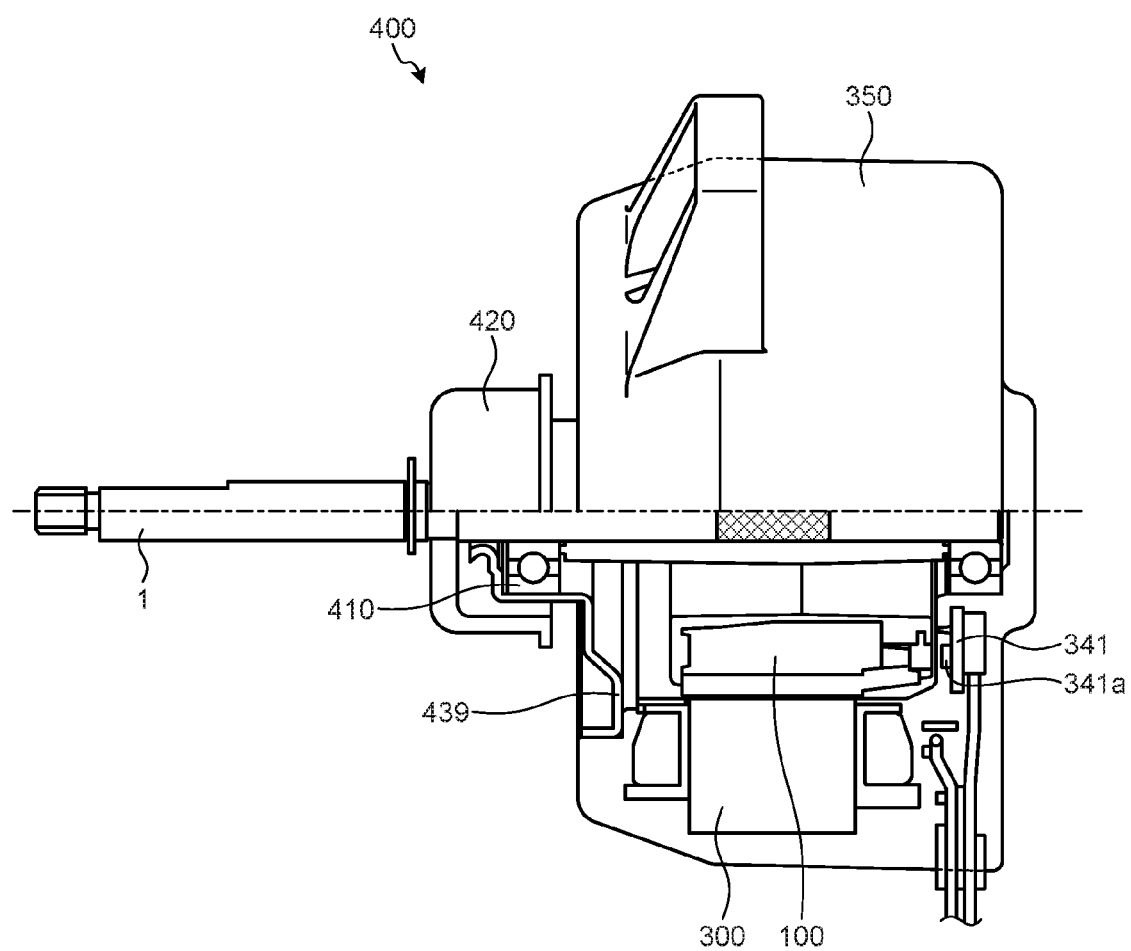
FIG. 6 is a vertical cross-sectional view illustrating a configuration of an electric motor according to the first embodiment.

Specifically, FIG. 2 is a side view as viewed from the position-detecting magnet side. FIG. 1 is a cross-sectional view taken along a line A-A in FIG. 2. FIG. 3 are diagrams illustrating a configuration of a yoke, where FIG. 3(a) is a side view as viewed from the opposite side to the position-detecting magnet, FIG. 3(b) is a cross-sectional view taken along a line B-B in FIG. 3(a), and FIG. 3(c) is a side view as viewed from the position-detecting magnet side. FIG. 4 are diagrams illustrating a configuration of a rotor magnet with a donut-shaped runner, where FIG. 4(a) is a side view as viewed from the opposite side to the position-detecting magnet, FIG. 4(b) is a cross-sectional view taken along a line C-C in FIG. 4(a), and FIG. 4(c) is a side view as viewed from the position-detecting magnet side. FIG. 5 are diagrams illustrating a configuration of the rotor magnet after the donut-shaped runner is removed, where FIG. 5(a) is a side view as viewed from the opposite side to the position-detecting magnet, FIG. 5(b) is a cross-sectional view taken along a line D-D in FIG. 5(a), and FIG. 5(c) is a side view as viewed from the position-detecting magnet side. FIG. 6 is a vertical cross-sectional view illustrating a configuration of an electric motor according to the present embodiment. With reference to FIGS. 1 to 6, the electric-motor rotor and the electric motor according to the present embodiment are described below.

An electric-motor rotor 100 according to the present embodiment relates to a rotor that is formed by molding a resin magnet portion 5 integrally with the outer periphery of a yoke 4 that is obtained by molding thermoplastic resin that contains soft magnetic material or ferrite.

The rotor 100 is molded by setting a shaft (an axis) 1, a rotor magnet 3, and a position-detecting magnet 11 in a resin-molding die, and then pouring thermoplastic resin 17 such as polybutylene terephthalate (PBT) into the resin-molding die.

After the molding, a bearing 410 (for example, a ball bearing (see FIG. 6)) is mounted to each side of the rotor magnet 3. In the following descriptions, the rotor 100, in which the number of magnetic poles is ten, is explained as an example. However, the number of magnetic poles is not limited to ten, and can be any even number. The rotor 100 is combined with a stator 300 described later to constitute a brushless DC motor, for example.

The bearing 410 contacts a surface 19 that is in contact with, and retains, a cylindrical shaft-outer-peripheral cylinder resin portion 31 that is formed from the thermoplastic resin 17 around the outer periphery of the shaft 1. A diamond knurl 2 is given on a portion of the shaft 1, which is in contact with the inner-diameter portion of the shaft-outer-peripheral cylinder resin portion 31. The diamond knurl 2 is sometimes simply referred to as "knurl". The diamond knurl 2 has a shape of knurled grooves that are given on the outer periphery of mainly a round object (the shaft 1 in this example), and functions as an anti-skid member. For example, in any non-visible section, mainly the diamond knurl 2 increases the friction coefficient in a connection portion of a press-fit component (an insert), or engages the knurls in an inner-diameter portion, and is used as an anti-skid and anti-rotation member.

The rotor magnet 3 and the position-detecting magnet 11 are described later in detail. First, molding of the rotor 100 using the thermoplastic resin 17 such as PBT is described.

Into a lower die (not illustrated) that is set in place in a vertical molding machine (not illustrated), the rotor magnet 3 is inserted starting from the axial end surface of the yoke 4 on which concave portions 6 are provided (the axial end surface on the opposite side to the axial end surface to which the position-detecting magnet 11 is attached), and then the rotor magnet 3 is mounted to the lower die.

The lower die includes a convex portion (not illustrated) that is fitted into a tapered notch 7 provided on the axial end surface of the yoke 4 on the side of the concave portions 6. At the time of fastening the die, the convex portion on the lower die (a core portion) is pressed against the notch 7 in order to ensure that the outer periphery of the resin magnet portion 5 is coaxial with the shaft 1.

The notch 7 is provided corresponding to (opposed to) a magnetic pole. Therefore, ten notches 7 are formed in the circumferential direction with a substantially equal spacing. The reason for providing the notch 7 corresponding to (opposed to) a magnetic pole is to form a substantially identical magnetic path of the yoke 4 to each magnetic pole.

The number of convex portions on the lower die, to be fitted into the notches 7, is five in this case. These five convex portions are respectively fitted into five (with a substantially equal spacing in the circumferential direction) of the ten notches 7. It is adequate that the rotor magnet 3 is inserted into the lower die starting from the axial end surface of the yoke 4 on which the concave portions 6 are provided, and at the time of mounting the rotor magnet 3 to the lower die, any five of the ten notches 7 in the yoke 4 fit therein the five convex portions on the lower die. This is effective to improve workability as compared to the case with five notches 7.

Further, at the time of molding when the thermoplastic resin 17 is filled, the shaft 1 is set at the center of the rotor magnet 3 in the lower die. The shaft 1 is given the diamond knurl 2 that serves as an anti-rotation member for the shaft-outer-peripheral cylinder resin portion 31.

Furthermore, on seat portions 50 of the rotor magnet 3, the position-detecting magnet 11 is set in place. Thereafter, the die is closed, into which the thermoplastic resin 17 such as PBT is injected and molded.

While the position-detecting magnet 11 is described later in detail, the position-detecting magnet 11 includes a step at each axial end on the inner-diameter side, and is symmetrical in the thickness direction. Due to the configuration as described above, at the time of attaching the position-detecting magnet 11 to the rotor magnet 3, the step on the axial-end side (the outer side) of the rotor magnet 3 is filled with the thermoplastic resin 17 such as PBT. This is effective to stop the position-detecting magnet 11 from slipping off in the axial direction.

A step is provided at each end of the position-detecting magnet 11 in its thickness direction. Therefore, the position-detecting magnet 11 can be attached to the rotor magnet 3 regardless of which is the outer or inner side. However, it is also adequate that a step is provided only on one side of the position-detecting magnet 11 in its thickness direction, and the step-side is positioned on the axial-end side (the outer side) of the rotor magnet 3.

The position-detecting magnet 11 includes a rib (not illustrated) that serves as an anti-rotation member when the step is filled with the thermoplastic resin 17.

It is assumed that the position-detecting magnet 11 is in a state of being set on the seat portions 50 of the rotor magnet 3. Into the lower die, the rotor magnet 3 is inserted starting from the axial end surface of the yoke 4 on which the concave portions 6 are provided, and is then mounted to the lower die. Therefore, the axial end surface of the yoke 4, on which the concave portions 6 are provided, is a bottom surface of the rotor magnet 3, while the opposite axial end surface, on which the position-detecting magnet 11 is set, is a top surface of the rotor magnet 3.

The position-detecting magnet 11 is located (substantially in a horizontal state) on the top surface of seats 34 and ribbed runners (a remaining product portion) on the inner side of position-detecting-magnet holding protrusions 35b on the seat portions 50.

At this time, there is a gap with a predetermined spacing between the outer peripheral surface of the position-detecting magnet 11 and the inner peripheral surface of the position-detecting-magnet holding protrusion 35b. Although detailed descriptions thereof are omitted, the lower die that is set in place on a turn table is rotated by 180° at a predetermined rotating speed, for example, at the time of molding. In a state where the position-detecting magnet 11 is placed on the seat portions 50 at the time of resin molding, when the lower die is rotated by 180° at a predetermined rotating speed, for example, then a centrifugal force is applied to the position-detecting magnet 11. However, there are the position-detecting-magnet holding protrusions 35b around the position-detecting magnet 11. Therefore, the position-detecting-magnet holding protrusions 35b prevent the position of the position-detecting magnet 11 from being displaced in the radial direction. The position-detecting magnet 11 is less likely to be removed from the rotor magnet 3. This improves the productivity.

By means of resin molding, the shaft-outer-peripheral cylinder resin portion 31 is formed from the thermoplastic resin 17 into a cylindrical shape on the outer periphery of the shaft 1 to increase the thickness. Around the outer periphery of this shaft-outer-peripheral cylinder resin portion 31, gate convex portions 32 for pouring the thermoplastic resin 17 are formed radially from the outer periphery of the shaft-outer-peripheral cylinder resin portion 31.

The thermoplastic resin 17 is poured from the axial end surface of the gate convex portions 32 on the side of the position-detecting magnet 11. Therefore, gate processing traces 32a remain on the axial end surface of the gate convex portions 32 on the side of the position-detecting magnet 11. The gate convex portions 32 are formed, for example, by a half of the number of magnetic poles (five gate convex portions that are half the ten magnetic poles in this example).

The gate convex portions 32 extend with a predetermined length in the radial direction from the shaft-outer-peripheral cylinder resin portion 31. The inner peripheral surface of a yoke-inner-peripheral cylinder resin portion 37, and the radially distal end of the gate convex portion 32 are spaced apart from each other by a predetermined distance. The gate convex portion 32 extends in a radial direction that is substantially the direction along the center of the magnetic pole of the resin magnet portion 5.

One axial end surface of the gate convex portions 32 (on the side of the position-detecting magnet 11) is positioned on the inner side of the axial end surface of the rotor magnet 3, on which the position-detecting magnet 11 is provided, by a predetermined dimension (for example, approximately 1 mm). The other axial end surface of the gate convex portions 32 is positioned at a die-mating-surface track 38 between the upper die and the lower die of the resin-molding die. Therefore, the axial length of the gate convex portions 32 is approximately a half of the axial length of the rotor magnet 3.

One axial end surface of the gate convex portions 32 (on the side of the position-detecting magnet 11) is positioned on the inner side of the axial end surface of the rotor magnet 3, on which the position-detecting magnet 11 is provided, by a predetermined dimension for the reason described below.

As described already, the thermoplastic resin 17 is poured from the axial end surface of the gate convex portions 32 on the side of the position-detecting magnet 11. The gate processing traces 32a remain on the axial end surface of the gate convex portions 32 on the side of the position-detecting magnet 11.

The gate processing trace 32a may sometimes project outward by any length from the axial end surface of the gate convex portion 32 on the side of the position-detecting magnet 11. In a case where there is something that interferes with a projection of the gate processing trace 32a, it is preferable that the projection of the gate processing trace 32a is accommodated on the inner side of the axial end surface of the rotor magnet 3 on the side of the position-detecting magnet 11.

For example, when the outer diameter of the bearing 410 (a ball bearing, for example) is smaller than the inner diameter of the yoke-inner-peripheral cylinder resin portion 37, the projection of the gate processing trace 32a is likely to interfere with the mold of a molded stator 350.

Therefore, one axial end surface of the gate convex portions 32 (on the side of the position-detecting magnet 11) is positioned on the inner side of the axial end surface of the rotor magnet 3, on which the position-detecting magnet 11 is provided, by a predetermined dimension, such that the gate processing traces 32a do not project outward from the axial end surface of the rotor magnet 3. This makes it possible to permit the region of the gate processing traces 32a to fall within the above dimension. Accordingly, improvement in the productivity is achieved.

A plurality of ribs 18 are radially formed between the shaft-outer-peripheral cylinder resin portion 31 and the yoke-inner-peripheral cylinder resin portion 37. In the example illustrated in FIG. 2, five ribs 18 are radially formed with a substantially equal spacing in the circumferential direction between the shaft-outer-peripheral cylinder resin portion 31 and the yoke-inner-peripheral cylinder resin portion 37 (FIG. 2). The ribs 18 extend in a direction between magnetic poles of the resin magnet portion 5.

The thermoplastic resin 17 reaches the resin magnet portion 5 and the position-detecting magnet 11 through the ribs 18. Therefore, the yoke 4 and the resin magnet portion 5 are integrated into the rotor magnet 3. The thermoplastic resin 17 is injected from the gate convex portions 32 directly into the shaft-outer-peripheral cylinder resin portion 31 on the outer periphery of the shaft, and therefore can be filled earlier. Accordingly, improvement in the weld strength of the shaft-outer-peripheral cylinder resin portion 31 is achieved.

On the other hand, conventionally the thermoplastic resin 17 is poured into the yoke-inner-peripheral cylinder resin portion 37, and is then filled in the shaft-outer-peripheral cylinder resin portion 31 through the ribs 18.

It is adequate that the number of the ribs 18, the thickness (in the circumferential direction) and the length (in the axial direction and the radial direction) of the ribs 18 are minimized as much as possible within a range where the ribs 18 have a strength to withstand a repetitive stress caused by a generated torque and an intermittent operation of an electric motor, in order to achieve a cost reduction.

Further, it is possible to adjust the transmitted vibration force from the resin magnet portion 5 to the shaft 1 by adjusting the rigidity of the ribs 18 in the circumferential direction by means of changing the number of the ribs 18, and the thickness (in the circumferential direction) and the length (in the axial direction and the radial direction) of the ribs 18. Therefore, a reduction in noise of an electric motor is achieved, and accordingly the quality of a product is improved.

At the time of molding the electric-motor rotor 100 using the thermoplastic resin 17, both the axial end surfaces of the resin magnet portion 5 near its outer periphery are pressed by a die to fill the thermoplastic resin 17. This prevents formation of a flash on the outer periphery of the resin magnet portion 5. Because of no need for a flash removing process, improvement in the productivity and quality is achieved.

Some of the notches 7 in the yoke 4 (in this example, five notches 7 into which the convex portions on the lower die are not fitted), the concave portions 6 (10 concave portions) that serve as a gate for the yoke 4, and the seat portions 50, are filled with the thermoplastic resin 17 so as to serve as a torque-transmitting member and an anti-rotation member in the rotating direction.

The concave portions 6 in the yoke 4, and the seat portions 50 are filled completely with the thermoplastic resin 17. Therefore, when the thermoplastic resin 17 is molded and shrunken in the inner-diameter direction, the thermoplastic resin 17 is caught by the concave portions 6 in the yoke 4, and by the outer peripheral surface of the seat portions 50. This prevents formation of a gap between the thermoplastic resin 17 and the rotor magnet 3, and accordingly can prevent a reduction in the coupling force.

That is, the concave portions 6, each of which prevents a projection of a gate processing trace 6a from protruding from the axial end surface of the yoke 4, and the seat portions 50 for positioning the position-detecting magnet 11, are used, and therefore there is no need for an additional structure that prevents a reduction in the coupling force. Accordingly, a reduction in costs and a reduction in noise are both achieved.

Next, the yoke 4 that constitutes the rotor magnet 3 is described in detail.

The yoke 4, provided on the inner side of the rotor magnet 3, is obtained by injection molding of thermoplastic resin that contains soft magnetic material or ferrite.

At the time of molding the yoke 4, on the outer side of a portion of the die, which forms the outer periphery of the yoke 4, a strong magnet is located to provide an oriented magnetic field. Therefore, soft magnetic material or ferrite contained in the yoke 4 is oriented with anisotropy to the polar direction. Due to the oriented magnetic field as described above, the yoke 4 is oriented with anisotropy to the polar direction.

The yoke 4 is formed generally into a cylindrical shape. On the outer periphery of the yoke 4, concave portions 47 and convex portions 48 are located alternately. The number of the concave portions 47 is ten, and the number of the convex portions 48 is also ten.

Each of the concave portions 47 corresponds to (is opposed to) a magnetic pole of the resin magnet portion 5. Each of the convex portions 48 corresponds to (is opposed to) a portion between magnetic poles of the resin magnet portion 5. A configuration is also possible, in which each of the concave portions 47 corresponds to (is opposed to) a portion between magnetic poles of the resin magnet portion 5, and each of the convex portions 48 corresponds to (is opposed to) a magnetic pole of the resin magnet portion 5.

On one axial end surface of the yoke 4, a plurality of the concave portions 6 (with a circular shape, for example), each of which has a predetermined depth in the axial direction, are formed (equal to the number of magnetic poles) with a substantially equal spacing in the circumferential direction.

The concave portions 6 respectively correspond to (are opposed to) the convex portions 48 (magnetic poles of the resin magnet portion 5) on the outer periphery of the yoke 4. In this example, because there are ten magnetic poles in the electric-motor rotor, ten concave portions 6 are formed accordingly.

Thermoplastic resin that contains soft magnetic material or ferrite is poured from the respective concave portions 6 to the yoke 4. Therefore, on the yoke 4 after the molding, the gate processing traces 6a remain at each gate opening for pouring thermoplastic resin.

One reason for providing the concave portions 6 is to prevent a projection of the gate processing trace 6a from protruding from the axial end surface of the yoke 4. Therefore, the depth of the concave portions 6 in the axial direction is sufficient to prevent the projection of the gate processing trace 6a from protruding from the axial end surface of the yoke 4.

Gate openings (remaining as the gate processing traces 6a) for pouring thermoplastic resin are provided by the number of magnetic poles (ten magnetic poles in this example). This makes the pouring state of thermoplastic resin that contains soft magnetic material or ferrite even to the magnetic poles at the time of the injection. This also makes the orientation state even. Therefore, improvement in the quality of the yoke 4 is achieved.

Further, each of the gate openings (remaining as the gate processing traces 6a) is provided at the magnetic-pole position, which is an optimal position for the orientation of thermoplastic resin that contains soft magnetic material or ferrite. Therefore, improvement in the quality of the yoke 4 is achieved.

Furthermore, each of the gate openings (remaining as the gate processing traces 6a) is provided on one axial end surface of the yoke 4 at the center of the concave portion 6 that has a round shape (a circular shape), and that is notched inward in the axial direction by a predetermined length. This can prevent a flash that remains on the gate processing trace 6a from protruding outward from the axial end surface. Therefore, interference with the positioning during the manufacturing process is suppressed, and formation of waste products is also suppressed. Accordingly, improvement in the manufacturing quality is achieved.

In a cavity portion 80 of the yoke 4, a tapered portion 45 is defined from the axial end surface, on which the concave portions 6 are provided, to substantially the center position in the axial direction (the die-mating-surface track 46 at the time of molding the yoke 4). The tapered portion 45 has a tapered shape that is gradually narrowed inward from the axial end surface on which the concave portions 6 are provided.

Further, a straight portion 44 with a constant diameter is defined from the die-mating-surface track 46 to the axial end surface on the side of the seats 34.

The tapered portion 45 is formed using a fixed-side die. The straight portion 44 is formed using a movable-side die. The tapered portion 45 is formed using a fixed-side die, thereby reducing a force of a product (the yoke 4) to stick to the fixed-side die at the time of opening the die. Further, the straight portion 44 is formed using a movable-side die, thereby causing a resistance against the force of a product (the yoke 4) to stick to the fixed-side die at the time of opening the die. Therefore, the fixed-side die is smoothly removed from a product (the yoke 4), and accordingly improvement in the manufacturing quality is achieved.

On the axial end surface of the yoke 4 on which the concave portions 6 are provided, the tapered notches 7, each of which reaches the tapered portion 45 by a predetermined width, are formed at a magnetic-pole position between the concave portions 6. The number of the notches 7 is ten. Each of the notches 7 is formed so as to ensure that it is coaxial with the straight portion 44 and the outer periphery of the yoke 4.

At the time of molding the resin magnet portion 5 integrally with the yoke 4 using resin magnet, or at the time of molding the rotor magnet 3 integrally with the shaft 1 using the thermoplastic resin 17, the die holds the notches 7 in a manner to keep them coaxial with each other. This makes it possible for the notches 7 to ensure the coaxiality and the phase. Therefore, improvement in the manufacturing quality is achieved.

On an axial end surface of the yoke 4 on the opposite side to the axial end surface of the yoke 4 on which the concave portions 6 are provided, the seats 34 are provided through a seat connecting portion 33. The position of the seats 34 in the circumferential direction corresponds to (is opposed to) a magnetic pole. That is, the seats 34 are formed with a substantially equal spacing in the circumferential direction, where the number of the seats 34 is ten. Each of the seats 34 is configured by a pair of protruding portions 34a that protrude outward in the axial direction, and an opening 34b that is formed between the pair of protruding portions 34a.

As described later, the opening 34b serves as a resin-magnet supply path for molding the resin magnet portion 5 integrally with the yoke 4. The opening 34b has a width substantially identical to the width of resin-magnet supply runners (ribbed runners 35 described later).

The seats 34 are connected with each other by the seat connecting portion 33, each of which has a protruding shape on the seat connecting portion 33. The seat connecting portion 33 is provided with a predetermined height from the axial end surface of the yoke 4 on the opposite side to the axial end surface of the yoke 4 on which the concave portions 6 are provided. For example, the seat connecting portion 33 has a flat shape with a constant thickness in the axial direction. On the seats 34, the position-detecting magnet 11 is set in place to be away from the end surface of the yoke 4 by a distance determined by the sum of the height of the seat connecting portion 33 and the seat 34 itself.

The seat connecting portion 33 has an inner diameter that substantially corresponds with the inner diameter of the yoke 4. That is, the inner peripheral surface of the seat connecting portion 33 is formed by extending the inner peripheral surface of the yoke 4 in the axial direction, and is continued from the inner peripheral surface of the yoke 4. This facilitates manufacturing of a die for the yoke 4, and therefore achieves a reduction in costs of a rotor.

A section of the seat connecting portion 33, where the seats 34 are provided, is extended on the radially outer side of a section of the seat connecting portion 33, which connects the seats 34 with each other. That is, the outer peripheral surface of a section of the seat connecting portion 33, where the seats 34 are provided, is positioned on the radially outer side of the outer peripheral surface of a section of the seat connecting portion 33, which is between the seats 34. The outer peripheral surface of a section of the seat connecting portion 33, which is between the seats 34, is positioned on the radially inner side of the outer peripheral surface of the seats 34.

Next, the rotor magnet 3 is described.

The rotor magnet 3 according to the present embodiment is obtained by accommodating the yoke 4 in a lower die (not illustrated) that is set in place in a vertical molding machine, and then injecting and molding resin magnet of thermoplastic resin that contains, for example, rare earth samarium onto the outer periphery of the yoke 4 to integrate the resin magnet portion 5 with the yoke 4.

At the time of molding the resin magnet portion 5, on the outer side of a portion of the die, which forms the outer periphery of the resin magnet portion 5, a strong magnet is located to provide an oriented magnetic field. Therefore, magnetic particles contained in the resin magnet portion 5 are oriented with anisotropy to the polar direction.

A core portion of the die for molding the resin magnet portion 5, which is inserted into the cavity portion 80 of the yoke 4, is formed on a lower die (not illustrated). The core portion is inserted from the axial end surface of the yoke 4, on which the concave portions 6 are provided, into the cavity portion 80, and then the yoke 4 is mounted to the die.

In a state where the yoke 4 is mounted to the die, the end surface of the core portion on the lower die for forming the resin magnet portion 5 is positioned at the end surface of the yoke 4 on which the seats 34 are provided.

Convex portions (not illustrated), to be fitted into the notches 7 provided on the axial end surface of the yoke 4 on the side of the concave portions 6, are provided on the core portion (the lower die) of the die for molding the resin magnet portion 5. Therefore, the yoke 4 is positioned in the circumferential direction relative to the position of the magnet that generates an oriented magnetic field.

The convex portions of the core portion, which are fitted into the notches 7, are ensured to be coaxial with the outer periphery of the resin magnet portion 5, and are pressed against the notches 7 at the time of fastening the die. This ensures that the outer periphery of the resin magnet portion 5 is coaxial with the yoke 4.

Resin-pouring portions for molding the resin magnet portion 5 are provided on a donut-shaped runner 36 that is formed on the end surface of the core portion (the lower die) of the die for molding the resin magnet portion 5. The number of the resin-pouring portions is a half of the number of magnetic poles (in this example, five, which is a half of the ten magnetic poles). The resin-pouring portions are provided with a substantially equal pitch in the circumferential direction. The resin-pouring portions for molding the resin magnet portion 5 remain as resin-pouring portion traces 36a on the donut-shaped runner 36. The resin-pouring portion traces 36a are formed substantially in the middle between every other two adjacent ribbed runners 35 in the circumferential direction.

The donut-shaped runner 36 protrudes toward the seats 34 from the end surface of the resin magnet portion 5 or the yoke 4 with substantially a height (in the axial direction) of the seats 34 on the yoke 4. That is, the donut-shaped runner 36 is located on the inner side of the yoke 4, and the axial end surface of the donut-shaped runner 36 is as high as the top-end surface of the seats 34.

From the outer periphery of the donut-shaped runner 36, the ribbed runners 35 extend radially by an equal number of magnetic poles (ten, in this example). The ribbed runners 35 are provided by an equal number of the seats 34. Each of the ribbed runners 35 extends toward its corresponding seat 34. The ribbed runners 35 are formed with a height (in the axial direction) substantially identical to the donut-shaped runner 36.

As already described, the resin-pouring portions (the resin-pouring portion traces 36a) for molding the resin magnet portion 5 are provided at the substantially middle position between the adjacent ribbed runners 35.

The donut-shaped runner 36 and the ribbed runners 35 are formed using an upper die, and therefore have a tapered shape that is narrowed from the end surface of the core portion (the lower die) toward the axially outer side, in order to reduce sticking of the donut-shaped runner 36 and the ribbed runners 35 to the upper die at the time of opening the die.

Further, the donut-shaped runner 36 is drilled from the end surface of the core portion (the lower die) straightly into a concave shape by a predetermined depth (in the axial direction). This causes a resistance against sticking of the donut-shaped runner 36 to the upper die at the time of removing the die. Therefore, the upper die is smoothly removed from the donut-shaped runner 36.

The ribbed runners 35 radially extending from the donut-shaped runner 36 further extend across the axial end surface of the yoke 4 on the side of the seats 34 from the axial end surface of the core portion (the lower die) of the die for molding the resin magnet portion 5, and then reach the openings 34b on the inner peripheral side of the seats 34. Furthermore, the ribbed runners 35 extend outward from the openings 34b on the outer peripheral side of the seats 34 to a predetermined position away from the other periphery of the yoke 4 on the axial end surface of the resin magnet portion 5.

Resin magnet is poured into the resin-pouring portions (the resin-pouring portion traces 36a) of the donut-shaped runner 36. The resin magnet flows in the axial direction through runners (axial runners (not illustrated)) to the resin-pouring portions (the resin-pouring portion traces 36a), and then changes the flow direction at the resin-pouring portions (the resin-pouring portion traces 36a) by 90°. That is, the flow of resin magnet splits into two directions perpendicular to the axial direction. Thereafter, each of the two flows of resin magnet enters the nearest ribbed runner 35 from the resin-pouring portion (the resin-pouring portion trace 36a), and further changes the flow direction by 90° to flow into the resin magnet portion 5.

At this time, a portion for changing the flow direction of resin magnet (the resin-pouring portion (the resin-pouring portion trace 36a), that is a portion for flowing the resin magnet through the axial runner in the axial direction, and splitting the flow into two directions perpendicular to the axial direction) can be located within the die. This is because the donut-shaped runner 36 including the resin-pouring portions (the resin-pouring portion traces 36a) is located on the inner side of the inner periphery of the yoke 4.

For example, when the flow direction is changed on the axial end surface of the yoke 4, the injection pressure of resin magnet, having flowed through the axial runners in the axial direction, is likely to damage the yoke 4, such as forming a hole through the end surface.

In the present embodiment, within the die, there are portions for changing the flow direction of resin magnet (the resin-pouring portions (the resin-pouring portion traces 36a), that are portions for splitting a flow of resin magnet through the axial runners in the axial direction into two directions perpendicular to the axial direction). Therefore, the flow of resin magnet through the axial runners in the axial direction is less likely to damage the yoke 4 and other components. Accordingly, improvement in the manufacturing quality is achieved.

In the cavity portion 80 of the yoke 4, the straight portion 44 with a substantially constant diameter of the cross-sectional circle is defined from the end surface on the side of the seats 34 to the die-mating-surface track 46. Also, a gap is minimized between the straight portion 44 and the core portion (the lower die) of the die for forming the resin magnet portion 5, where the core portion is fitted into the straight portion 44. This makes it possible to suppress leakage of the resin magnet into the gap between the straight portion 44 and the core portion (the lower die) of the die. Therefore, improvement in the manufacturing quality is achieved.

In a case where a rare-earth resin magnet portion 5 is formed around the outer periphery of the yoke 4, because the material (rare-earth resin magnet) is costly, it is preferable to minimize the thickness of the resin magnet portion 5. In this case, a resin-pouring portion for pouring the resin magnet directly into the resin magnet portion 5 needs to be smaller in size according to the thickness of the resin magnet portion 5. As the resin-pouring portion is smaller in size, the molding pressure is increased.

Meanwhile, as described in the present embodiment, the runners are formed of the donut-shaped runner 36 and the ribbed runners 35 that extend radially from the outer periphery of the donut-shaped runner 36 by an equal number of magnetic poles. Also, the resin-pouring portions (the resin-pouring portion traces 36a) are provided on the donut-shaped runner 36. Therefore, the gate diameter of the resin-pouring portions can be set to any diameter, and accordingly improvement in the manufacturing quality is achieved.

The number of resin-magnet pouring portions (the resin-pouring portion traces 36a) is reduced to a half (five) of the number of magnetic poles (ten magnetic poles). Therefore, the ratio of the amount of runners to a product (the resin magnet portion 5) can be reduced as compared to the case where the resin-magnet pouring portions are provided by the number of magnetic poles.

The amount of runners is a total amount of the donut-shaped runner 36, the ribbed runners 35, and other runners (the axial runners (not illustrated)).

The term "runner" is defined as a portion between the resin magnet portion 5 and the resin-magnet pouring portion of the die, which does not become the product (the resin magnet portion 5). Specifically, the term "runner" indicates the donut-shaped runner 36, the ribbed runners 35, and other runners (not illustrated).

However, in the case with the rotor magnet 3 according to the present embodiment, a part of the ribbed runner 35 (a portion from the inner peripheral surface to the radially distal end of the seat 34) becomes the product. That is, the donut-shaped runner 36, the ribbed runners 35 (excluding a portion from the inner peripheral surface to the radially distal end of the seat 34), and other runners (not illustrated) are removed after the completion of molding the rotor magnet 3.

The amount of the runners according to the present embodiment (the donut-shaped runner 36, the ribbed runners 35 (excluding a portion of the yoke 4 from the inner peripheral surface to the radially distal end of the seat 34), and other runners (not illustrated)) can be reduced by approximately 30% as compared to the case where the resin-magnet pouring portions are provided by the number of magnetic poles (ten, in this example).

Although detailed descriptions thereof are omitted, the ratio of the amount of other runners (not illustrated) relative to the entire runner amount is higher as compared to the donut-shaped runner 36 and the ribbed runners 35. Therefore, as the number of resin-pouring portions is reduced, the entire runner amount is also reduced. Accordingly, in the present embodiment, there are five resin-magnet pouring portions, and thus the entire runner amount is reduced as compared to the case where the resin-pouring portions are provided by the number of magnetic poles (ten, in this example).

In the case of reusing the runners which do not become the product, the configuration, in which the resin-magnet pouring portions are provided by a half of the number of magnetic poles, reduces the amount of runners, and therefore decreases the reuse ratio as compared to the case where the resin-magnet pouring portions are provided by the number of magnetic poles (ten, in this example). Accordingly, degradation of the physical properties of resin magnet (mainly, a mechanical strength) can be suppressed, and consequently improvement in the manufacturing quality is achieved.

Further, while the number of resin-pouring portions is a half of the number of magnetic poles, the number of the ribbed runners 35 is equal to the number of magnetic poles. Therefore, the state of pouring resin magnet becomes uniform to each of the magnetic poles. It is also possible to make the orientation state even. Accordingly, improvement in the manufacturing quality is achieved.

The donut-shaped runner 36, the ribbed runners 35 (excluding a portion from the inner peripheral surface to the radially distal end of the seat 34), and other runners (not illustrated) are removed after the completion of molding the rotor magnet 3. A portion of the ribbed runner 35, which extends from the donut-shaped runner 36 to the inner peripheral surface of the seat 34, is removed.

Therefore, the seat portion 50 is configured by the protruding portions 34a of the seat 34 and an unremoved portion 35a of the ribbed runner 35, which extends from between the protruding portions 34a (the opening 34b) to the radially outer side. Specifically, in the unremoved portion 35a, resin magnet, which fills the opening 34b to the top end of the protruding portions 34a, extends radially outward, and the distal end of the unremoved portion 35a is connected integrally with the top-end surface of the resin magnet portion 5. The unremoved portion 35a further includes, at its distal end, the position-detecting-magnet holding protrusion 35b that protrudes outward in the axial direction.

As described already, the position-detecting magnet 11 is located (substantially in a horizontal state) on the top surface of the seats 34 and the ribbed runners 35 (a remaining product portion) on the inner side of the position-detecting-magnet holding protrusions 35b on the seat portions 50. In a state where the position-detecting magnet 11 is placed on the seat portions 50 before resin molding, when the lower die is rotated by 180° at a predetermined rotating speed, for example, then a centrifugal force is applied to the position-detecting magnet 11. However, there are the position-detecting-magnet holding protrusions 35b around the position-detecting magnet 11. Therefore, the position-detecting-magnet holding protrusions 35b prevent the position of the position-detecting magnet 11 from being displaced in the radial direction. The position-detecting magnet 11 is less likely to be removed from the rotor magnet 3. This improves the productivity.

A portion of the ribbed runner 35, which is formed on the resin magnet portion 5 on the outer side of the yoke 4, is used as a positioning protrusion that positions the rotor magnet 3 in the circumferential direction at the time of molding the rotor magnet 3 integrally with the shaft 1 using the thermoplastic resin 17.

For example, there is a case where the positioning protrusion (a portion of the ribbed runner 35 on the outer side of the yoke 4), the position-detecting-magnet holding protrusion 35b, and the seat 34 are formed only from resin magnet. In that case, upon removing the donut-shaped runner 36 and the ribbed runners 35, these protrusions and seat are connected with each other only by a resin-pouring portion into the resin magnet portion 5, and therefore there is a problem of low strength.

However, the seats 34 are provided on the yoke 4, and further the central portion of the seats 34 is opened to provide the openings 34b so as to integrate the ribbed runners 35 with the seats 34, thereby improving the strength. Therefore, improvement in the manufacturing quality is achieved.

In order to change the performance of an electric motor, it is necessary to change the axial length of the resin magnet portion 5 without changing the axially center position of the resin magnet portion 5 relative to a stator. However, there is a case where the axial position of the position-detecting magnet 11 relative to the stator cannot be changed. Even in this case, the rotor magnet 3 can still be formed without increasing the required amount of resin magnet unnecessarily, while ensuring the resin-magnet pouring path by adjusting the height of the seat connecting portion 33. Therefore, a reduction in costs of the rotor 100 can be achieved.

As described above, resin magnet passes from the donut-shaped runner 36 through the ribbed runners 35, fills the outer periphery of the yoke 4, and then integrates the yoke 4 with the resin magnet portion 5. Thereafter, a portion of the ribbed runners 35 on the inner side of the inner-peripheral-side surface of the seats 34, and the donut-shaped runner 36 are removed, thereby obtaining the rotor magnet 3 according to the present embodiment.

In the above descriptions, the rotor magnet 3 is used as an example, in which the outer periphery of the yoke 4 has a concave-convex shape, and the resin magnet portion 5 is molded integrally with the outer periphery of the yoke 4. However, it is adequate that the outer periphery of the yoke 4 has a circular shape, and is partially provided with a concave shape or a convex shape, and the resin magnet portion 5 is molded around the outer periphery of the yoke 4 to form the rotor magnet 3.

The rotor magnet 3 can also be made up of only a resin magnet.

It is also adequate that a sintered magnet or a molded resin magnet is bonded to the yoke 4 to form the rotor magnet 3.

It is apparent that, regardless of the outer-peripheral shape of the yoke 4, or the material or fixing method of a magnet to be located around the outer periphery, the same effects are obtained by molding general-purpose thermoplastic resin so as to fill the concave portions 6, each of which prevents the gate processing trace 6a provided on one end surface of the yoke 4 from protruding from the end surface, and then integrating the shaft 1, the rotor magnet 3, and the position-detecting magnet 11 with each other.

Next, the position-detecting magnet 11 is described. The position-detecting magnet 11 having a ring shape includes a step (not illustrated) at each axial end on the inner-diameter side, and is symmetrical in the thickness direction.

The position-detecting magnet 11 is provided at one axial end of the electric-motor rotor 100. Thermoplastic resin such as PBT is filled in the step at each axial end of the inner-diameter side of the position-detecting magnet 11 to serve as an anti-skid member in the axial direction for the position-detecting magnet 11.

The position-detecting magnet 11 has a symmetrical shape in the thickness direction, and therefore can be set in a die regardless of the direction. This reduces a work time. Accordingly, improvement in the productivity and a cost reduction are both achieved.

The position-detecting magnet 11 is not limited to including a step at each axial end on the inner-diameter side, and can include a step at either one of the axial ends. This step can also be positioned on the axial end-side of the electric-motor rotor 100.

The position-detecting magnet 11 includes a rib (not illustrated) that serves as an anti-rotation member when the step is filled with thermoplastic resin.

The electric-motor rotor 100 according to the present embodiment is combined with an electric-motor stator, for example, to constitute a brushless DC motor (a synchronous electric motor). The stator can be a molded stator formed using mold resin that is thermosetting resin such as a bulk molding compound (BMC).

FIG. 6 illustrates a configuration of a molded electric motor. As illustrated in FIG. 6, an electric motor 400 includes the shaft 1, the electric-motor rotor 100, the bearing 410, a bracket 439, a waterproof cap 420, the molded stator 350 formed by molding the electric-motor stator 300, a sensor substrate 341, and other elements.

The sensor substrate 341, connected to an external device, is mounted to the electric-motor stator 300. The sensor substrate 341 and the electric-motor stator 300 are mechanically and electrically joined, and are thereafter subjected to a molding process to constitute the molded stator 350. The sensor substrate 341 includes a position-detecting Hall element 341a on the surface on the side of the position-detecting magnet 11.

Next, components, such as the electric-motor rotor 100 (to which the bearing 410 is attached) and the bracket 439, are mounted to the molded stator 350 to constitute the electric motor 400.

In the manner as described above, by using the electric-motor rotor 100 and the electric-motor stator 300, the electric motor 400 can be obtained with improved quality at reduced costs.

As described above, in the present embodiment, the seats 34, on which the position-detecting magnet 11 is placed, are formed on the seat connecting portion 33, and the unremoved portion 35a of the ribbed runner 35, which fills the opening 34b of the seat 34, extends radially outward from between the protruding portions 34a to be connected integrally with the axial end surface of the resin magnet portion 5.

According to the present embodiment, even when the resin magnet portion 5 and the position-detecting magnet 11 are distanced from each other in the axial direction, the height of the seat connecting portion 33 is adjusted, and therefore there is no need to change the height of the seats 34. Accordingly, while ensuring the resin-magnet pouring path, it is possible to reduce the usage amount of resin magnet, and thus achieve a reduction in costs of the rotor 100.

For example, in a case of changing performance of the electric motor 400 under the configuration that uses the molded stator 350 (FIG. 6) with an identical positional relation between the stator 300 and the sensor substrate 341, it is necessary to change the axial length of the resin magnet portion 5. However, there is a case where the axially center position of the resin magnet portion 5 relative to the stator 300 cannot be changed. In such a case, the resin magnet portion 5 and the position-detecting magnet 11 may sometimes be distanced from each other in the axial direction. According to the present embodiment, even in the case as described above, an electric motor with desired performance can still be configured by adjusting the height of the seat connecting portion 33 without changing the height of the seats 34. Also, the required amount of resin magnet can be reduced.

In the present embodiment, under the configuration that uses the molded stator 350 (FIG. 6) with an identical positional relation between the stator 300 and the sensor substrate 341, it is possible to use the rotor 100 with a varied axial length of the resin magnet portion 5, and therefore early depreciation of the molded-stator die is possible. Therefore, it is possible to reduce costs of the electric motor 400.

In the present embodiment, molding of the seats 34 is facilitated. This makes it possible to improve the quality of the rotor 100. That is, even when the resin magnet portion 5 and the position-detecting magnet 11 are distanced from each other in the axial direction, the height of the seat connecting portion 33 is adjusted, and then there is no need to increase the height of the seats 34. This facilitates molding of the seats 34.

When the rotor 100 is integrally molded using the thermoplastic resin 17, the thermoplastic resin 17 tightly holds the outer-diameter side of the seat connecting portion 33, and therefore the resin magnet portion 5 is rigidly held through the yoke 4. This makes it possible to improve the quality of the rotor 100.

In the present embodiment, the seat connecting portion 33 has an inner diameter equal to the inner diameter of the yoke 4, and is formed at a position to which the inner-diameter side of the yoke 4 is extended. This facilitates machining of a molding die for the yoke 4, and makes it possible to achieve a cost reduction.

In the present embodiment, the outer peripheral surface of a section of the seat connecting portion 33, where the seats 34 are provided, is positioned on the radially outer side of the outer peripheral surface of a section of the seat connecting portion 33, which is between the adjacent seats 34. Therefore, when the rotor 100 is molded integrally using the thermoplastic resin 17, the outer peripheral surface of the seat connecting portion 33 serves as an anti-rotation member for the resin magnet portion 5, and therefore reliably transmits a torque of the magnet. This makes it possible to improve the quality of the rotor 100.

Further, according to the present embodiment, the electric-motor rotor 100 with improved quality at reduced costs is used, and therefore improvement in the quality of the electric motor 400 can be achieved.

Second Embodiment

Figure 7:
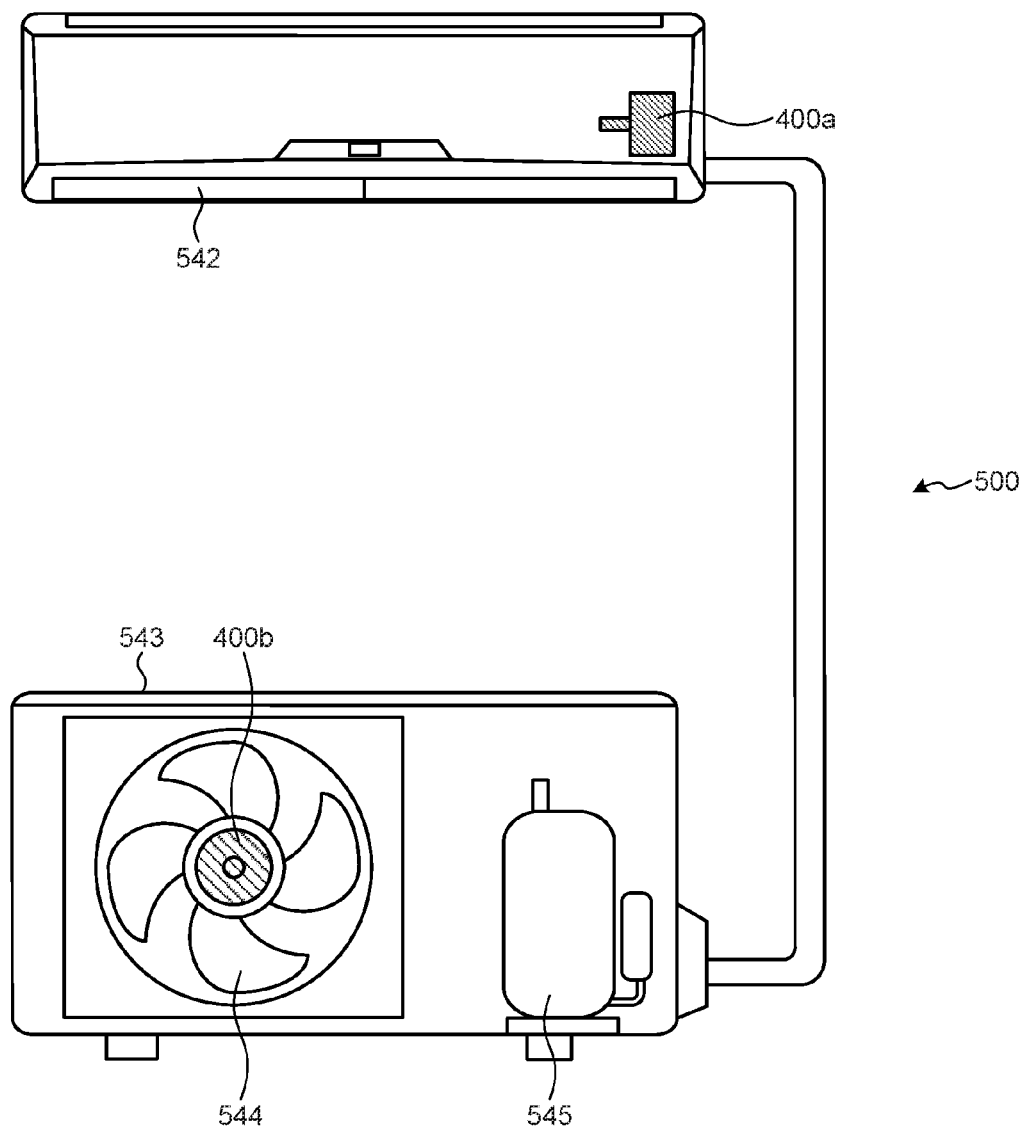
FIG. 7 is a diagram illustrating a configuration of an air conditioner according to a second embodiment.

FIG. 7 is a diagram illustrating a configuration of an air conditioner according to a second embodiment of the present invention. An air conditioner 500 according to the present embodiment includes an indoor device 542 and an outdoor device 543 that is connected to the indoor device 542. The outdoor device 543 includes an air blower that includes a molded electric motor 400b and fans 544. The indoor device 542 also includes an air blower that includes a molded electric motor 400a. Each of the molded electric motors 400a and 400b is the electric motor described in the first embodiment. The outdoor device 543 includes a compressor 545.

According to the present embodiment, the electric motor according to the first embodiment with improved quality at reduced costs is used as an electric motor for the air blower, which is the main component of the air conditioner 500, and therefore improvement in the quality of the air conditioner 500 is achieved.

The electric motor according to the first embodiment is applied to the compressor 545, and therefore further improvement in the quality of the air conditioner 500 is achieved.

INDUSTRIAL APPLICABILITY

The present invention is suitable for an electric-motor rotor, an electric motor, and an air conditioner.

The invention claimed is:
1. An electric-motor rotor comprising:
a cylindrical yoke;
a resin magnet portion that is formed from resin magnet integrally with an outer periphery of this yoke;
a position-detecting magnet that is located on one axial-end side of this resin magnet portion;
a plurality of seats that are formed in a circumferential direction on an axial end surface of the yoke on a side of the position-detecting magnet, each of which includes a pair of protruding portions, and an opening formed between the pair of protruding portions, and places the position-detecting magnet on the pair of protruding portions; and
a seat connecting portion that is formed on the axial end surface, that is formed with the seats on a top surface of the seat connecting portion, and that connects the seats, wherein
a runner that supplies the resin magnet to the resin magnet portion through the opening is provided at the opening to form, along with the seat, a seat portion that places thereon the position-detecting magnet.

2. The electric-motor rotor according to claim 1, wherein an inner diameter of the seat connecting portion is equal to an inner diameter of the yoke, and
an inner peripheral surface of the seat connecting portion is formed by extending an inner peripheral surface of the yoke in an axial direction.

3. The electric-motor rotor according to claim 1, wherein an outer peripheral surface of a section of the seat connecting portion, where the seats are provided, is positioned on a radially outer side of an outer peripheral surface of a section of the seat connecting portion, which is between adjacent seats.

4. An electric motor comprising the electric-motor rotor according to claim 1.

5. An air conditioner comprising an air blower that includes the electric motor according to claim 4.

* * * * *